Patented Nov. 29, 1932                                                    1,888,997

UNITED STATES PATENT OFFICE

FORREST B. McLANE, OF RIVERA, CALIFORNIA

INSECTICIDE

No Drawing.         Application filed March 15, 1930. Serial No. 436,250.

This invention relates to an improved insecticide, and has for one of its principal objects the control of the volatilization or release of an insect poison such as nicotine sulphate and the like, by means of a carbo-hydrate preferably of the saccharate group, such as cane sugar, beet sugar, corn syrup, glucose, molasses or the like.

One of the principal objects of this invention is the provision of means for retarding the volatilization of nicotine or the like to such an extent that the poison is effective for several days at ordinary summer temperatures, thereby permitting the use of a much weaker mixture than heretofore, the insects succumbing to the weaker but more prolonged action as well or probably better than to a brief powerful fumigation.

Another important object of the invention is to provide an insecticide having a high value as a stomach poison. In the practice of this invention an internal poison is provided for the larvæ on account of the long period of activity of the slowly volatilizing mixture of the improved composition of this invention, as compared with an asphyxiant. In the use of the ordinary fumigant, the adult insects usually succumb to the asphyxiating effects thereof, but the larva or worm stage usually escapes for the reason that it can only be effectively reached by poison which it eats. The product of this invention acts both as a fumigant and a stomach poison.

Other and further important objects of the invention will be apparent from the disclosures in the following specification.

The invention, in a preferred form, is hereinafter more fully described.

Quite varied proportions of carbo-hydrates with nicotine and nicotine salts may be used with equally good results, as the retarding effect is exerted in any proportion. In practice, however, it has been found that the maximum proportion for the sugar content is that wherein such content just falls short of injuring the plants, and the minimum content of the poison is that degree of dilution wherein it is ineffective against the insect. When the solution becomes of a syrup viscosity, it cannot be used on plant life without severe injury thereto. However, from 8 to 10 lbs. of sugar or 1 gallon of syrup and one half pint of nicotine sulphate 40% solution in water per 100 gallons of water have been used for satisfactory insect control without injury to the plants.

Heretofore, nicotine in various forms has been used, particularly caseinate or algenate, as an internally administered vermifuge for poultry, but this requires the use of an alkaline material in order to stimulate the release as distinguished from the present theory which depends upon a slow constant release for control, this method being exactly opposite to other types previously in use.

Both laboratory and field experimental work was carried on to determine whether or not the dilutions of nicotine could be reduced and give the same control. It was found that in a good many cases this could be done. It was also found that in the case of insects having a short life cycle, there was enough nicotine left after a period of ten days to give a fair control. In cases of other insects, in both the larval and adult stages, the material acted as a repellant for a long period of time; this being the result of a slow, constant release of nicotine fumes. Under ordinary conditions where nicotine is used alone or with an activator, the fumes are usually gone at the end of twenty-four hours. On one particular test under laboratory conditions, it was found that there was still eighty-six per cent (86%) of nicotine present after a ten day period. The tests made on the more resistant insects showed that a better control was obtained than with any other form of nicotine.

This material can also be used in concentrated form as a simple solution of nicotine or nicotine salt, sugar or syrup, water, etc. particularly where such vermin as poultry lice etc. are concerned, and the nicotine content in these cases can be reduced to one-half of the strengths now ordinarily used. Snails and slugs may also be controlled by means of this combination mixed with cornmeal or other dry ingredient which comprises a bait, and this combination of nicotine and sugar undoubtedly opens a field of insect control thereby which has in the past been considered as requiring the use of arsenic.

As an illustration of the especial utility of this formula, it is found that when chicken roosts are treated with the liquid phase of this formula the heat of the fowl releases the fumes sufficiently to kill the body infestation the first night, and that the spray remains active long enough to kill any hatching eggs of the lice, the normal period of incubation of which is about five days, so that the return of the fowl to the treated roost effectually rids it of the vermin in all stages.

It will be evident that herein is provided an insecticide provided by the addition of sugar to nicotine sulphate or free nicotine whereby the following operating results are obtained. In fact, the nicotine is held in combination longer, a saving in cost is effected, a longer control period results, at least a partial control is obtained on insects where the regular forms of nicotine were of no value, an actual stomach poison results, and a slow contact agent is provided.

I am aware that many changes may be made in the nature of the ingredients used and the proportions thereof varied throughout a wide range without affecting the principles of this invention, and I, therefore, do not purpose limiting the patent granted hereon otherwise than as necessitated by the prior art.

I claim as my invention:

1. An insecticide comprising nicotine sulphate and sugar in solution, the same being thoroughly incorporated into a much greater proportion of a fluid carrying agent.

2. A combination insecticide and larvacide comprising nicotine sulphate, 7 lbs.; a retarding agent as sugar, 3 lbs.; and water, 4 lbs.

In testimony whereof I affix my signature.

FORREST B. McLANE.